United States Patent [19]

Reust

[11] Patent Number: 5,128,908
[45] Date of Patent: Jul. 7, 1992

[54] PRESSURE FEEDBACK SERVOVALVE FOR A SEISMIC VIBRATOR

[76] Inventor: Dennis K. Reust, 116 Fairview, Ponca City, Okla. 74601

[21] Appl. No.: 608,834

[22] Filed: Nov. 5, 1990

Related U.S. Application Data

[63] Continuation-in-part of Ser. No. 506,281, Apr. 9, 1990, abandoned.

[51] Int. Cl.⁵ .......................................... H04R 23/00
[52] U.S. Cl. ..................................... 367/190; 91/461; 137/625.64
[58] Field of Search .................. 367/189, 190; 91/461; 181/119; 137/625.62, 625.64

[56] References Cited

U.S. PATENT DOCUMENTS

| | | | |
|---|---|---|---|
| 3,126,031 | 3/1964 | Hayner | 137/625.64 |
| 3,260,273 | 7/1966 | Hayner | 137/625.64 |
| 3,461,909 | 8/1969 | Vöhringer | 137/625.64 |
| 3,958,492 | 5/1976 | Curless | 91/363 R |
| 4,265,331 | 5/1981 | Leonard | 367/140 |
| 4,741,364 | 5/1988 | Stross et al. | 137/625.64 |

Primary Examiner—Ian J. Lobo

[57] ABSTRACT

An apparatus for reducing harmonic distortion and causing a more linear response in a hydraulic vibrator apparatus which generates a seismic signal into the surface of the earth is disclosed. The force developed in the actuator of a hydraulic vibrator is directly related to pressure applied to the hydraulic piston. Conventional vibrators use flow control type servovalves to develop this pressure. Changes in loading due to earth surface conditions reflect back as changes in pressure across the hydraulic piston. Pressure can be better controlled in the actuator such that it varies only as a function of the input signal, and the natural response of a vibrator can be made more linear, and the harmonic distortion can be reduced by using a pressure control type servovalve. Apparatus for changing a flow control type servovalve into what is essentially a pressure control type servovalve includes hydraulic feedback passageways provided from the output ports of the servovalve main stage to the input ports of the servovalve main stage. The passageways are constucted to provide differential negative pressure feedback around the servovalve main stage. Further apparatus damps the servovalve output to increase stability, and further tunes the valve to its load. It consists of a bypass passageway to port hydraulic fluid between the two output ports of the servovalve main stage. Orifices in the pressure feedback and bypass passageways determine the feedback gain and the amount of damping.

8 Claims, 4 Drawing Sheets

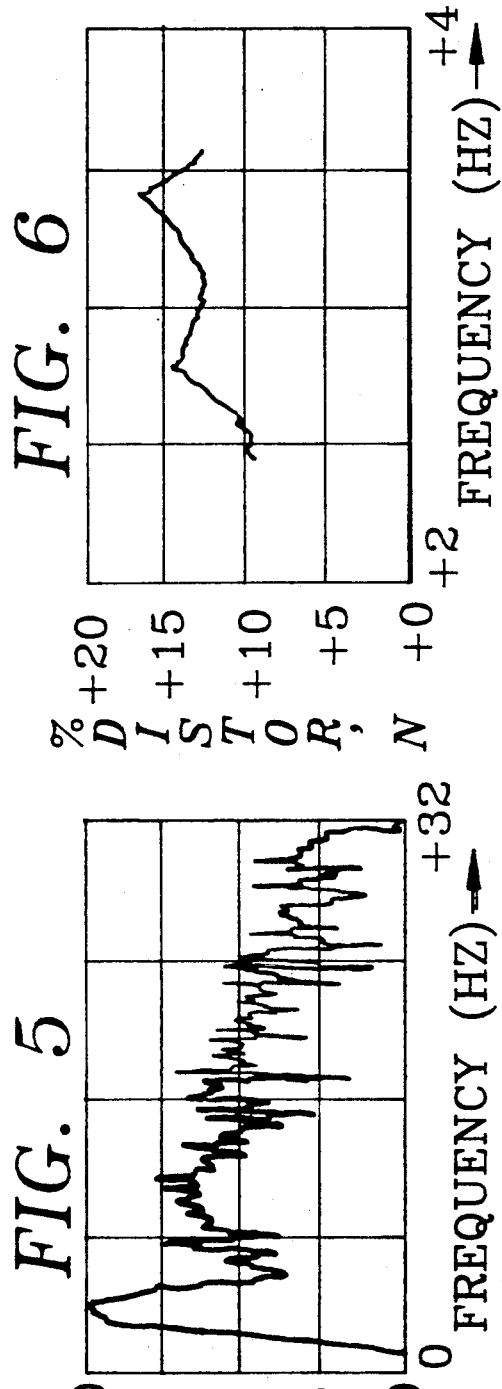
FIG. 6
FIG. 5
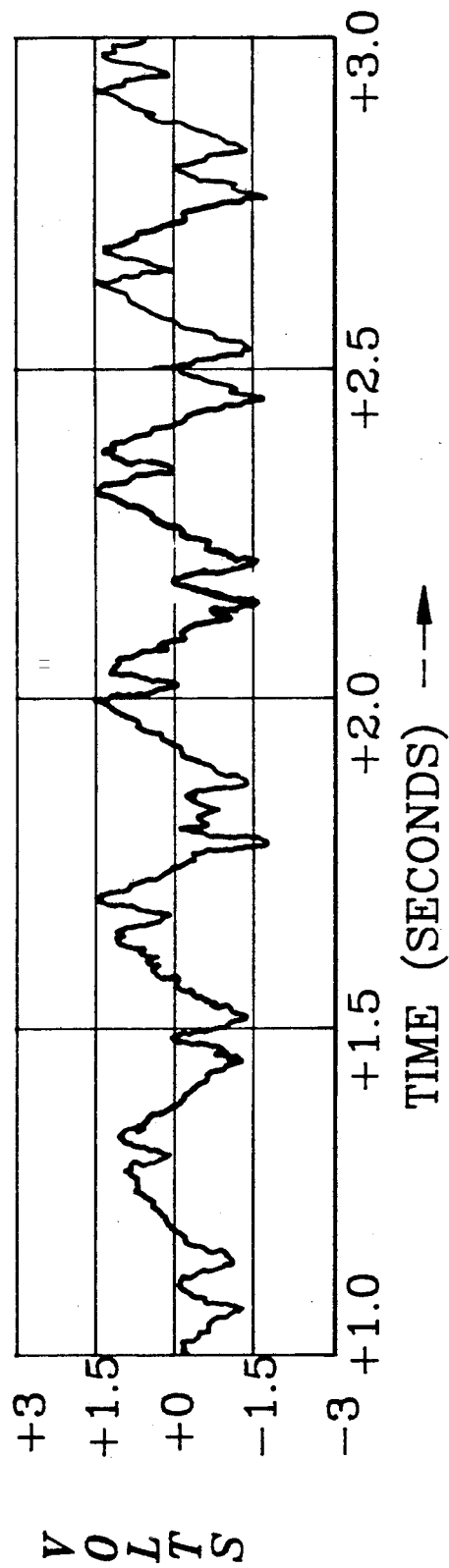
FIG. 7

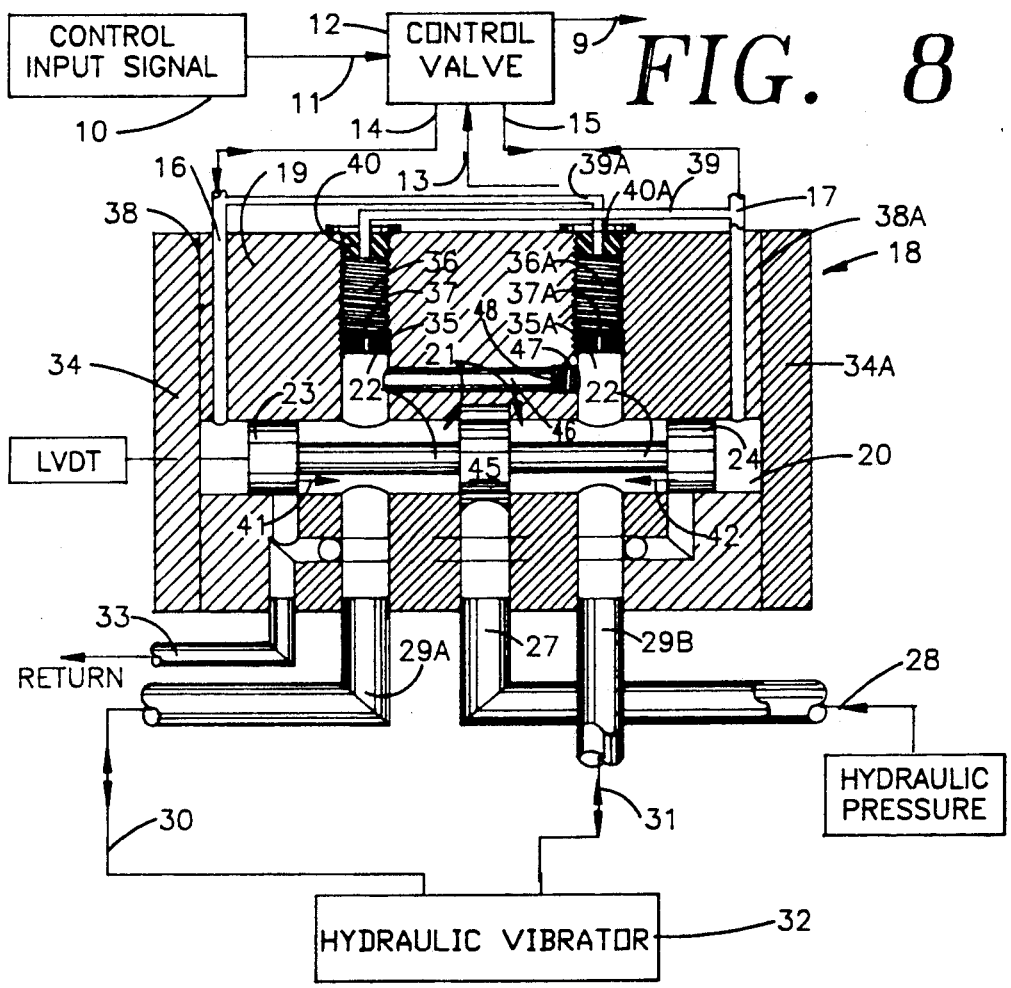

PRESSURE FEEDBACK SERVOVALVE FOR A SEISMIC VIBRATOR

RELATED APPLICATION

This application is continuation-in-part of application Ser. No. 506,281 filed Apr. 9, 1990, by the same inventor and now abandoned.

BRIEF DESCRIPTION OF THE PRIOR ART

U.S. Pat. No. 3,023,782 issued to A. Chaves, Jr., et al, entitled Mechanical Feedback Flow Control Servovalve illustrates a mechanical device for improving the overall signal output quality from the control valve.

U.S. Pat. No. 3,228,423 issued to William C. Moog, Jr., entitled Fluid Control Valve in which a Mechanical Motion is Transmitted from a Dry Region to a Pressurized Fluid Filled Region describes a hydraulic control valve with a linear response. The output flow is proportional to the input signal and has means for correcting frictional forces over part or all of the operating range of the valve in order to improve the linearity of response of the valve. The improvement is accomplished by using an armature for a dry torque motor which through a seated and frictionless pivot actuates a flapper associated with one or more fluid nozzles which in turn have an operative association with the valve spool.

U.S. Pat. No. 4,184,144 issued to James E. Rickenbacker and titled Measurement and Control of the Output Force of a Seismic Vibrator is related to a system for controlling the force imparted to the ground a seismic vibrator by measuring the peak force imparted to the earth and then controlling the signal amplitude in response to the measured signal in order to achieve the desired force magnitude.

U.S. Pat. No. 4,637,002 issued to John J. Sallas, entitled Seismic Source Vibrator Having Self Tuning Controller describes an electronic method for self tuning the seismic source by using a feedback network. The controller includes a state variable technique with inaccessible states estimated by an electronic model.

U.S. Pat. No. 4,679,591 which is issued to Dale N. Mauel and titled Servovalve Drive Electronics Improvements defines an electronic method for improving the signal output from a servovalve system.

U.S. Pat. No. 4,751,687 titled Method of Reducing Harmonic Distortion in Continuous Wave Seismic Vibration by Elmo W. Christenson deals with a method for driving a seismic vibrator with a control signal to produce an output signal having minimized harmonic distortion. The method includes a step of producing a plurality of harmonic distortion signals related to a fundamental frequency of the control signal. The phase and amplitude of the harmonic distortion signal is then varied to produce with the vibrator sweeps a variation of the distortion signal. From among the variations, a particular one is selected that improves the overall transmission of the vibrator signal. This patent relates to a method for improving the output signal by changing the input signal.

U.S. Pat. No. 3,126,031 titled Electro Hydraulic Servo Valve by Paul F. Hayner relates to a method of providing flow feedback to a servovalve to linearize the flow output.

U.S. Pat. No. 3,260,273 titled Motor Valve Having Differential Pressure Feedback by Paul F. Hayner discloses a method of providing differential pressure feedback to a mechanically driven stage of a hydraulic servovalve. It does not address the problem of providing pressure feedback to a hydraulically driven stage of a servovalve or damping the feedbacks and servovalve output.

U.S. Pat. No. 4,741,364 titled Pilot-Operated Valve with Load Pressure Feedback by Kenneth J. Stoss and Richard A. Felland relates to a single-ended pressure feedback valve which closes communication through a single feedback passage upon a predetermined movement of the pilot solenoid valve so that the pilot valve can be fully opened without having to overcome the effect of pressure feedback. It does not address differential negative feedback, continuous feedback, or hydraulic damping of the valve output.

U.S. Pat. No. 3,461,909 titled Valve Arrangement by Karl Vohringer shows a pressure relief valve.

U.S. Pat. No. 4,265,331 by Willie B. Leonard titled Fluidic Repeater relates to a valve arrangement which feeds back a hydraulic flow which is solely dependent on the position of a mechanical part. This is position feedback as compared to pressure feedback. It involves shaped sliding orifices which are blocked when a mechanical member is in the neutral position and which open proportionately to the displacement of the member from its neutral position. It does not disclose differential negative pressure feedback, or continuous feedback, or hydraulic damping of the servovalve output. It does not reduce harmonic distortion of a seismic vibrator or other actuator. It replaces electrical means such as an LVDT (Linear Variable Displacement Transformer) for centering a spool or other mechanical member.

BRIEF DESCRIPTION OF THE INVENTION

This invention applies to a servo controlled hydraulic vibrator apparatus. The vibrator has an earth contacting baseplate which vibrates to provide energy for seismic exploration. The baseplate is driven by an actuator which is a double acting hydraulic cylinder. The baseplate is rigidly attached to a piston rod which has an attached piston located between its two ends which extend from both ends of the hydraulic cylinder. The outside portion of the cylinder is heavy and serves as a reaction mass for the piston to work against in its reciprocating motion. The actuator is controlled by a hydraulic servovalve which ports high pressure hydraulic fluid from a hydraulic power supply and exhausts fluid back to the power supply under control of an electrical signal. This invention improves vibrator linearity such that the output more closely follows the input electrical control signal; and the natural earth/baseplate resonance is damped; and the distortion is decreased. These improvements result from changes in the main stage of a hydraulic servovalve which ports fluid into and out of a conventional vibrator actuator. The improvements transform the servovalve from a flow control valve into a pressure control valve. Hydraulic damping is applied to the servovalve hydraulic output. The servovalve is transformed into a pressure control valve by porting differential negative pressure feedback from the hydraulic output ports of the servovalve main stage to the hydraulic input ports of the servovalve main stage. This pressure feedback is a differential flow of hydraulic fluid through two passageways based upon the differential pressure applied to the piston of the vibrator actuator. The differential pressure applied to the piston represents the load on the servovalve. The amount of feedback to be applied is determined by orifices in each feedback passageway. Hydraulic damping of the load is achieved by providing a restricted hydraulic path between the two output ports of the servovalve. The amount of damping is determined by an orifice.

BRIEF DESCRIPTION OF THE FIGURES

FIG. 5 is a graph of the amplitude spectrum in decibels versus frequency of a signal incorporating the feedback apparatus of this invention;

FIG. 6 is a graph of the percent distortion versus frequency of such a signal;

FIG. 7 is a graph of the ground force signal transmitted into the ground; and,

FIG. 8 is a partial schematic crossection of a servovalve having 3 pistons and incorporating the feedback apparatus.

DETAILED DESCRIPTION OF THE INVENTION

Figure 1:
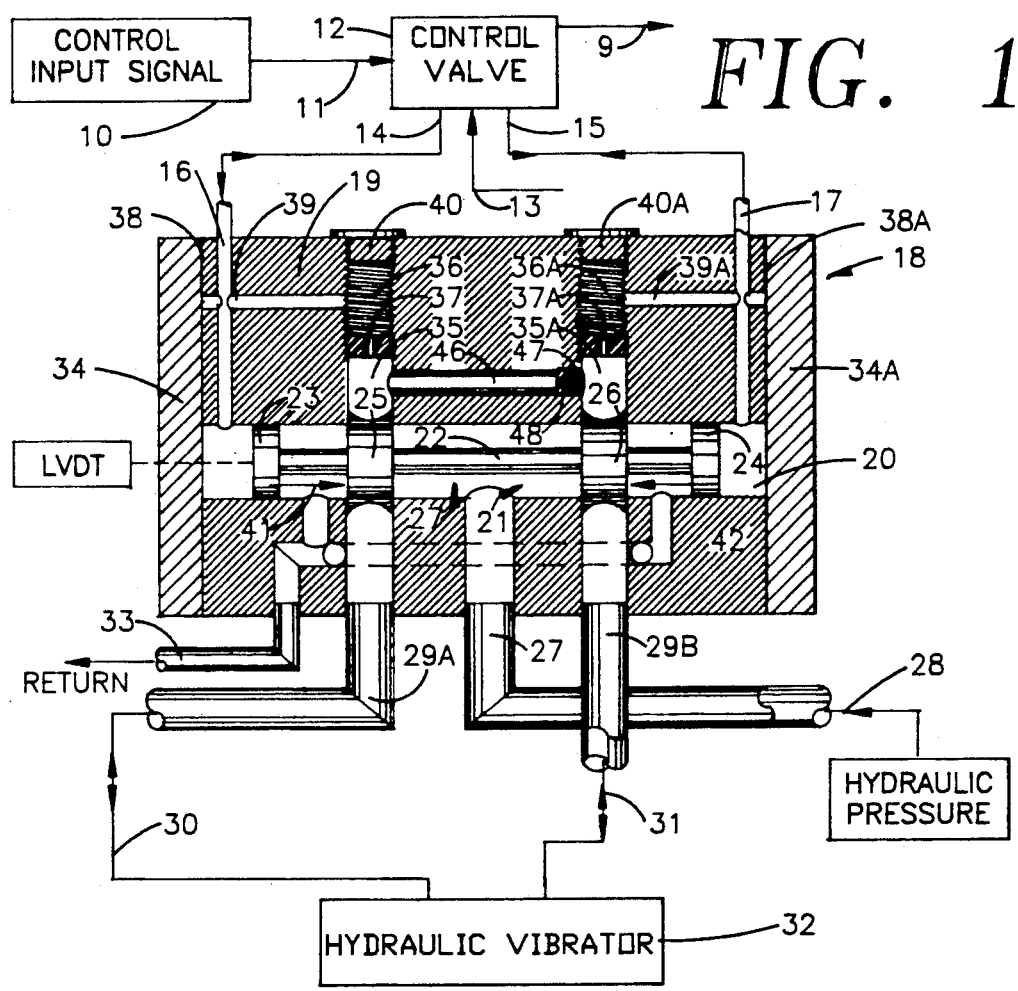
FIG. 1 is a cross-sectional view of a servohydraulic valve illustrating the feedback and damping ports for reducing distortion and linearizing the vibrator response.

Seismic vibrators are known to generate undesirable harmonic distortion. Producing the harmonic distortion not only wastes energy and makes the vibrator's output more difficult to measure and control, but also decreases the signal to noise ratio of the detected signals. Harmonic distortion can result from non-linearities in a vibrator's servohydraulic system, non-linearities on the earth load on the vibrator, non-linear coupling between the earth and the vibrator and bending of vibrator mechanical members such as the baseplate.

A particular source of non-linearity in the vibrator's servohydraulic system is the flow control type servovalve which all servohydraulic seismic vibrators have used to the present time. A flow control servovalve is designed to output a flow of hydraulic fluid nearly proportional to an input electrical current assuming constant pressure drop across the servovalve.

Improvement can be made by converting a conventional flow control type servovalve into a pressure control servovalve since differential pressure in the actuator is directly proportional to the force developed in the vibrator's actuator. A pressure control servovalve makes the vibrator less sensitive to load variations which reflect back to the actuator as pressure changes. It also makes the action of the vibrator more linear since force, not flow or velocity, is the desired output of the vibrator.

Another non-linearity which is a major source of harmonic distortion is the null in the center of the main valve's spool travel. The null is a small region of travel in which the valve remains closed as it crosses over from porting high pressure hydraulic fluid into one side of the hydraulic cylinder and begins to port it into the other side. As the servovalve is passing through the null region, the heavy reaction mass is approximately at its maximum acceleration. Because of its inertia, the reaction mass then acts as a pump for a short time and builds up pressure inside the cylinder, often times to levels considerably higher than the hydraulic supply pressure. Such a hydraulic pressure surge can result in distortion at the peaks of the ground force signal.

Improvement can be made both by applying pressure feedback and by applying a restricted bypass port across the output of the servovalve. Pressure feedback tends to move the spool out of its null position whenever the pressure on one side of the actuator piston becomes abnormally high and the pressure on the other side of the piston becomes abnormally low.

The invention helps to prevent cavitation in both the servovalve and the actuator because the valve with pressure feedback relieves abnormal vacuum which may cause cavitation at the same time it relieves abnormally high pressure on the other side of the actuator piston. The bypass port has a direct and immediate effect on relieving both abnormally high pressures and abnormal vacuums because it provides direct although restricted fluid communication between the two sides of the actuator's piston. The bypass port has no effect when the pressures on both sides of the actuator piston are the same, and has its maximum effect when the differential pressure across the piston is greatest.

Referring to all of the FIGURES, but in particular to FIG. 1 a servohydraulic control valve is illustrated. For purposes of simplifying the invention, the entire detail of a servohydraulically controlled vibrator is not disclosed. Such servohydraulic vibrator is clearly known as illustrated by U.S. Pat. No. 3,306,391 issued on Feb. 28, 1967 to Marvin G. Bays. Therefore, the specific details of the vibrator and its operation will not included in this Application.

A control input signal 10 is generally coupled through an electrical coupling 11 to a control valve 12 (also referred to as a pilot servovalve). Control valve 12 generally encompasses a torque motor which controls the position of a spool valve which transfers the flow of oil from an input pressure source 13 alternately to ports 14 and 15 which will provide pressure and exhaust alternately to input ports 16 and 17 of a servohydraulic valve main stage. Main stage referred to by arrow 18 comprises a housing 19 having a cylindrical bore 20 formed through housing 19. Inside cylindrical bore 20 is a spool valve generally referred to by arrow 21 which comprises a piston rod 22 having a first pair of pistons 23 and 24 attached or formed at each end of rod 22 and a second pair of pistons 25 and 26 or a third piston 45 (FIG. 8) attached or formed intermediate along the length of piston rod 22 between pistons 23 and 24. Some servovalve spools have 4 pistons (also referred to as lands) as illustrated in FIG. 1, and others perform the same functions with 3 pistons as illustrated in FIG. 8. A high pressure input port 27 is coupled to a source of high pressure hydraulic fluid (not shown) applied in the direction of arrow 28. A pair of output ports 29A and 29B are coupled through hydraulic passage ways 30 and 31 to a hydraulic vibrator 32 in the usual manner. Such details are well-known by those familiar with servovalves. A return port 33 provides a return for the hydraulic fluid to a pump inlet or other usual method for returning hydraulic fluid. The configuration of the apparatus as described is clearly within the state of the art and is further illustrated in a Moog catalog 762681 illustrated by the Moog 760 2-stage flow control servovalve.

The invention is applied to a conventional flow control valve by forming a first feedback port 35 which is formed by boring port 35 opposite port 29A which port is located at the location of piston 25 in its neutral position. Port 35 is in direct fluid connection with Port 29A. Port 35 is then threaded along its wall 36 and an orifice 37 is inserted therein. A second opening 39 is bored from face 38 into port 35 thereby forming a pathway from 29A through port 35 through opening 39 into port 16. Port 35 is sealed by a threaded plug 40. Hydraulic feedback to port 17 is provided by a system identical to that previously described, thus the feedback system has a corresponding port 35A in direct fluid connection with port 29B, a corresponding threaded portion 36A an orifice 37A opening 39A bored from face 38A and closed by plug 40A. End plates 34 and 34A close the corresponding faces 38 and 38A of the housing thereby sealing cylinder 20 and ports 3 and 39A. For simplification, no seals have been illustrated.

A bypass port schematically shown as ports 46 and 47 are formed to allow fluid passage between ports 29A and 29B which are in direct fluid communication respectively with ports 25 and 26. Port 47 is threaded along its walls and an orifice 48 is inserted.

Operation

An electrical input control signal generated at 10 such as a sweep signal, that is, a signal that begins at a low sinusoidal frequency and continuously sweeps to a higher frequency such as from 2 Hertz to 80 Hertz, for example, is applied through circuit 11 to control valve 12. When the signal is supplied to control valve 12, control valve 12 changes the porting of hydraulic fluid being supplied by input 13 from being ported out passage way 14 into port 16 and exhausting from port 17, to port 15 to return port 9, or vice versa. Thus, pressure is applied to either the face of piston 23 or 24 of servo control valve 18. If pressure is greater in port 16 than in port 17, then piston 23 will move in the direction of arrow 41. If the pressure is greater in port 17 than in port 16, then pressure will increase against the face of piston 24 moving the piston in the direction of arrow 42. Since pistons 25 and 26 are coupled to rod 22 along with pistons 23 and 24, any movement caused by pistons 23 or 24 in the direction of arrows 41 or 42 will cause fluid to port from port 27 into 29A or from port 27 into port 29B. If, for example, fluid is porting into port 29A then it will be applied to the hydraulic vibrator through hydraulic passage way 30. Fluid on the opposite side of the piston in the hydraulic cylinder (not shown) in hydraulic vibrator 32 will then be removed to the pump inlet through passage way 31 and port 29B to return 33.

Port 35 is in direct fluid communication with port 29A. When the fluid pressure at port 29A is high, then fluid will flow u port 35 through orifice 37 into opening 39 and to port 16 causing an increase in pressure on piston 23. The reverse will occur when the fluid pressure at port 29B is high. Fluid will then flow u port 35A through orifice 37A, into opening 39A and to port 17 causing an increase in pressure against piston 24. Since port 35 is in direct fluid communication with port 29A and passage way 30 to the hydraulic vibrator, a negative feedback is applied to valve spool 21 motion. This negative feedback is in proportion to the pressure on one side of the hydraulic vibrator's actuating cylinder. Likewise, negative feedback from the opposite side of the vibrator's actuating cylinder is applied through passageway 31, port 29B, port 35A, orifice 37A, passageway 39A, and passageway 17 to the face of piston 24.

This arrangement applies negative differential pressure feedback from the actuator of the hydraulic vibrator to the ends of the main valve spool 21.

The result is essentially a pressure control servovalve rather than a flow control servovalve. This increases the fidelity of the hydraulic vibrator actuator, makes it more linear, and decreases its distortion because the hydraulic vibrator's actuator force equals (pressure times the area) on one side of the piston minus (pressure times the area) on the other side of the piston. Actuator force is the applied force to the vibrator's 32 baseplate which in turn applies force to the earth. Some energy is lost due to baseplate inertia, coupling to the vehicle frame, and the like. However, the force is finally transmitted into the ground as a "ground force".

Phase and amplitude of ground force are typically controlled by currently available electronic systems for seismic vibrators. However, control of the vibrator becomes easier and more successful, and distortion is reduced when the servovalve is changed from a flow control device to a pressure control device and the vibrator is thus more linear. Phase and amplitude control become notably easier with a pressure control servovalve in the case of a high Q resonance between the vibrator 32 baseplate (not shown) and the load such as when the earth's surface is hard rock or thick ice. The pressure reflected back to the actuator (not shown) by the resonance with the load is reduced and damped by both pressure feedback and output bypassing ports 46 and 47 and orifice 48 as shown in FIGS. 1 and 8.

The pressure feedback servovalve also helps solve the problem of high pressure buildup while the reaction mass is at or near its peak acceleration and the valve spool 21 is in the null position as shown in FIG. 1. When pressure builds up, the pressure feedback pushes the valve spool out of the null position relieving the pressure. When abnormally high pressure builds up on one side of the vibrator actuator piston, abnormally low pressure may be present on the other side. Abnormally low pressure often results in cavitation and damage to metal parts. This low pressure feeds back to the valve spool 21 and tends to move it in the same direction the high pressure applied to the other end of the spool moves it. When the valve spool opens, both the high pressure and the abnormally low pressure are relieved to more normal and desirable pressures.

Fluid pressure from the output ports 29A and 29B is ported as previously described back through removable orifices 37 and 37A to the faces of pistons 23 or 24 respectively. The amount of feedback can be adjusted for each type of valve until satisfactory feedback is reached by changing the size of orifices 37 or 37A. The porting should be such that negative feedback is applied. This negative feedback tends to retard excursions of the valve spool and to cancel harmonic distortion.

Figure 2:
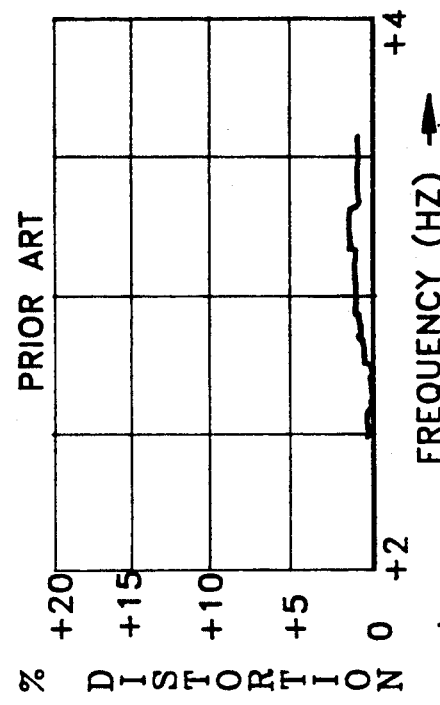
FIG. 2 is an amplitude spectrum graph in decibels versus frequency of a signal input by a prior art hydraulic vibrator.
Figure 3:
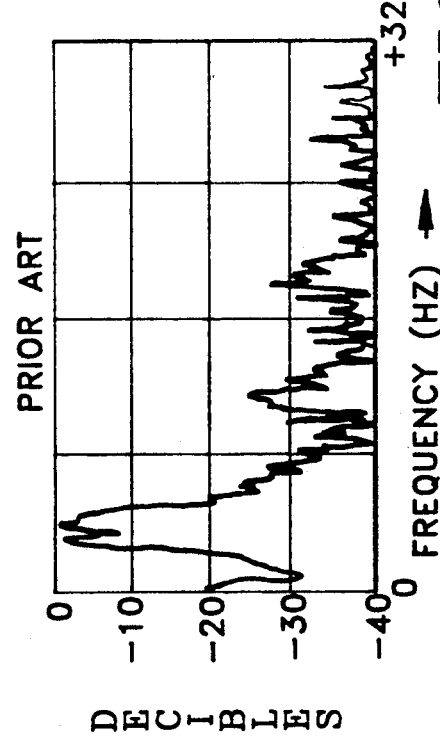
FIG. 3 is a graph of percent distortion versus frequency of a prior art signal being transmitted into the ground.

Referring to FIG. 2 a servohydraulic vibrator ground force output is illustrated using a standard servovalve without the feedback of this invention. Here the amplitude spectrum of the vibrator's ground force output for a single octave 2 to 4 Hz, four second linear sweep is illustrated. The major lobe on the left is a desired or fundamental energy shown in decibels (dB) and normalized to 0 dB. The energy shown to the right of the fundamental lobe is harmonic distortion. FIG. 3 illustrates a vibrator having a standard servovalve and illustrates percent distortion versus frequency. The vibrator harmonic distortion is in relative terms versus frequency.

Figure 4:
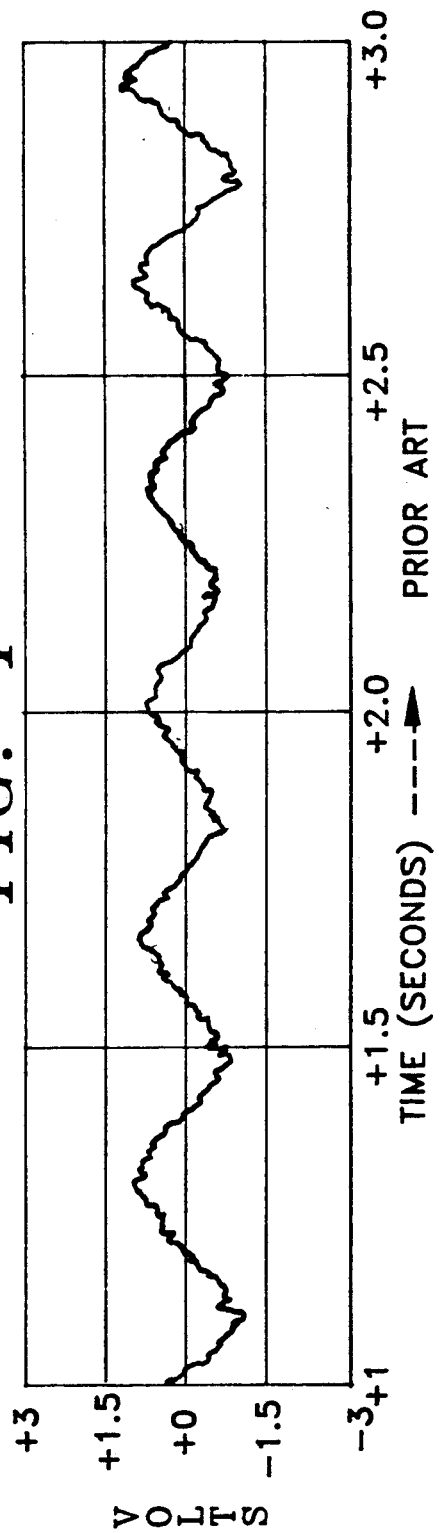
FIG. 4 is a graph of a prior art ground force signal being transferred into the ground.

FIG. 4 is a result of a standard servovalve driving a servohydraulic vibrator and illustrates the vibrator's "ground force" signal during the central portion of the four second linear sweep. The scale is in volts from a force measurement apparatus. The signal shows significant harmonic distortion. Seismic vibrators are known to produce more harmonic distortion at low frequencies than at high frequencies. Low frequencies were chosen for these plots to dramatize the problem and the solution, but the same problems and solution apply to relatively high frequencies though to a lesser extent. FIGS. 5, 6 and 7 illustrate the improved output from a servohydraulic vibrator using the negative hydraulic feedback system of this invention.

Referring in particular to FIG. 5, which is a plot of amplitude in decibels versus frequency. Harmonic distortion is reduced substantially, the majority of it being well below −30 db. FIG. 6 illustrates the distortion versus frequency of the improved servo controlled valve on a linear scale. The Percent distortion is indicated in relative terms. FIG. 7 illustrates the improved wave shape in vibrator output versus time. The "ground force" signal of the vibrator operated at approximately the same fundamental force as that shown in FIG. 4 illustrates that the "ground force" signal has remarkably less distortion than with the standard servovalve. The desired output is a sine wave. The equipment used to compile the information in FIGS. 2 through 7 is as follows:

Atlas model 10029-4 servovalve modified to provide pressure feedback. The data of FIGS. 2, 3 and 4 was taken with solid plugs in place of the orifices 37 and 37A. (FIG.1). The data of FIGS. 5, 6 and 7 was taken with a 0.043 inch diameter orifice in each port. The vibrator is a Mertz Model 11 Vibrator. The electronics is a Pelton Advance II Vibrator Control Electronics. In all tests, both the vibrator and the electronics were identical. Identical computer and software were used to plot the data in both cases.

FIG. 8 Description

Referring to FIG. 8, all of the same elements have the same numbers as in FIG. 1. The primary difference between FIG. 8 and FIG. 1 is the use of a single piston 45 rather than a pair of pistons 25 and 26 as illustrated in FIG. 1. The operation of the servohydraulic valve illustrated in FIG. 8 is nearly identical to that already described in FIG. 1. However, passageway 39 connects port 35 to port 17, and passageway 39A connects port 35A to port 16. This porting is necessary so that the differential pressure feedback will be negative in polarity. Passages 39 or 39A can be placed inside housing 19 as illustrated in FIG. 1 or outside housing 19 as illustrated in FIG. 8.

Conclusions

It is obvious that negative feedback provided by porting some of the output pressure from the servovalve main stage outputs through orifices and back to the input ports of the servovalve improves vibrator linearity and thereby provides the reduction in distortion accomplished by this invention. Providing a bypass means across the servovalve output improves stability of the system under varying load conditions, and damps resonances and noise in the hydraulic system, whether the resonances and noise are caused by hydraulic components or by ringing of mechanical components.

It is obvious that other modifications can be made in the invention as, for example, predetermining the exact size of the orifice and then drilling the proper diameter hole along ports 35, 35A, and 46 without using a replaceable orifice. It is also obvious that a valve could be used to control the amount of feedback without the necessity of an orifice, for example, pin or needle valves could be utilized in place of the orifices described in this invention. It is obvious that a valve with more than three or fewer than three stages of amplification can be used, and that pressure feedback can be applied either to the final stage, or to an intermediate stage. It is obvious that pressure feedback and output bypassing could apply to a servovalve designed such that the valve moves with a rotary motion rather than with a linear sliding motion. It is obvious that pressure feedback can also be applied if the high pressure supply ports and low pressure return ports are interchanged. It is obvious that pressure feedback could be applied to a sliding valve spool without mixing the hydraulic flow from pressure feedback with the flow from a previous hydraulic stage such as a pilot valve, by adding additional pistons to a valve spool shaft or by using a stepped diameter piston with a seal between the two diameters. It is obvious that other modifications can be made in this invention and still be well within the spirit and scope of this invention as described in the specifications, appended drawings and appended claims.

What I claim is:

1. Apparatus for improving linearity and reducing undesirable harmonic distortion of a seismic vibrator having a baseplate for contacting the earth, a hydraulically operated vibrator actuator having a piston and piston rod connected to said baseplate, and a reaction mass in sliding coupling with said piston rod, a servovalve including a pilot servovalve operatively coupled to said actuator and means for controlling said servovalve, an improved servovalve comprising:

(a) a housing having a central bore with first and second means for closing said central bore at its opposite ends;

(b) spool means including a piston rod positioned in said central bore for movement axially along said central bore, said spool means having a first pair of pistons mounted on the ends of said piston rod and at least an additional piston means having a first and second side and attached intermediate said first pair of pistons to said piston rod;

(c) first and second port means coupled to said central bore to communicate a controlled high pressure hydraulic fluid from said pilot servovalve to said central bore between said first and second means and said first pair of pistons in response to an electrical control signal causing said spool means to move axially in said central bore in response to a pressure differential in said hydraulic fluid at said first and second port means;

(d) hydraulic pressure input port means communicating with said central bore between said first pair of pistons;

(e) third and fourth port means communicating with said central bore and located on each side of said additional piston in a manner to provide pressurized hydraulic fluid alternately to first and second sides of said vibrator actuator piston means as said spool means is moved (f) hydraulic pressure feedback means communicating between said third and fourth port means and said first and second port means, to provide continuous predetermined quantity of hydraulic fluid communication between said third and fourth port means and said first and second port means respectively;

(g) hydraulic bypass means communicating between said third and fourth port means to provide continuous and controlled fluid communication between said third port means and said fourth port means;

wherein said harmonic distortion is substantially reduced and linearity of said vibrator actuator operation is improved.

2. Apparatus as described in claim 1 wherein an orifice means is mounted in said hydraulic feedback means and in said hydraulic bypass means for determining flow resistance.

3. Apparatus as claimed in claim 1 wherein said spool means comprises a second pair of spaced pistons and wherein said high pressure input port is located in said central bore between said second pair of spaced pistons.

4. Apparatus as claimed in claim 1 wherein said piston means comprises a single piston mounted over said high pressure input port to block said high pressure input port when said spool is in a centered or neutral position intermediate said first and second closing means.

5. In a hydraulic vibrator apparatus for generating a seismic signal into the surface of the earth, said hydraulic vibrator having a baseplate, a vibrator actuator having a piston and piston rod connected to said baseplate, and a reaction mass in sliding mechanical coupling with said piston rod, said vibrator actuator hydraulically operated by a servovalve having input ports, and having output ports coupled to said hydraulically operated vibrator actuator, and a pressure hydraulic input port to said servovalve, an apparatus for improving linearity and for reducing harmonic distortion of said seismic vibrator when transmitting a signal into said surface of the earth comprising:

(a) hydraulic feedback means coupled between said output ports and said corresponding input ports;

(b) hydraulic bypass means coupled from one output port of said servovalve to the remaining output port;

(c) means in said hydraulic feedback means for predetermining the flow resistance to hydraulic fluid passing from said output ports to said corresponding input ports; and, (d) means in said hydraulic bypass means for predetermining the flow resistance to hydraulic fluid passing from one output of said servovalve to the remaining output port.

6. Apparatus as described in claim 5 wherein said means for predetermining the flow resistance to hydraulic fluid is an orifice means.

7. Apparatus as described in claim 5 wherein said servohydraulic valve comprises a housing having a longitudinal cylinder therein with a spool valve slidably positioned therein, said spool valve having a pair of end pistons and an intermediate piston means, each of said input ports communicating with each of said end pistons; said input pressure port communicating with said longitudinal cylinder between said pair of end pistons; and wherein said hydraulic feedback means includes passageways formed in said servohydraulic valve between said output port and its corresponding input port, said passageways having means for limiting the quantity of hydraulic fluid passing through said passageways.

8. Apparatus as described in claim 7 wherein said means for limiting the quantity of hydraulic fluid comprises an orifice.

* * * * *